BEST AVAILABLE COPY
J. E. WIGGIN.
Eyeletting-Machine.
No. 6,489.
Reissued June 15, 1875.
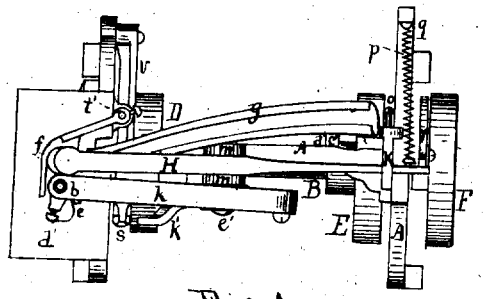
Fig. 1.
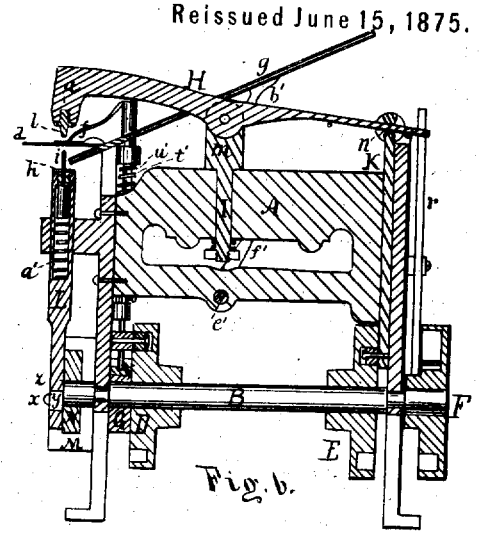
Fig. 6.
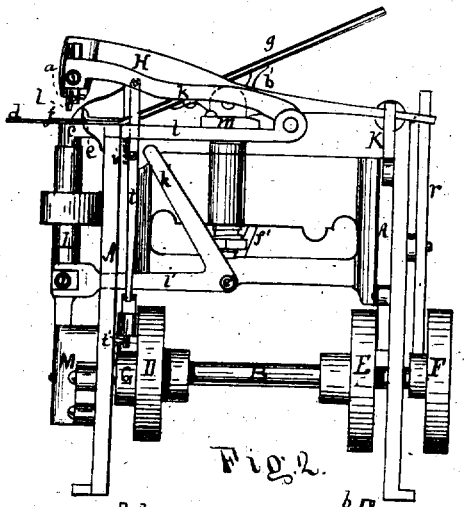
Fig. 2.
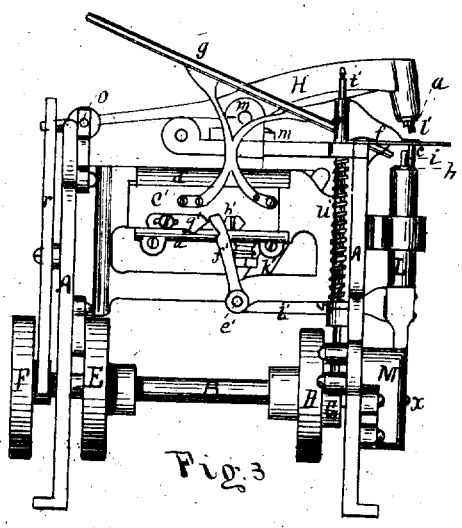
Fig. 3
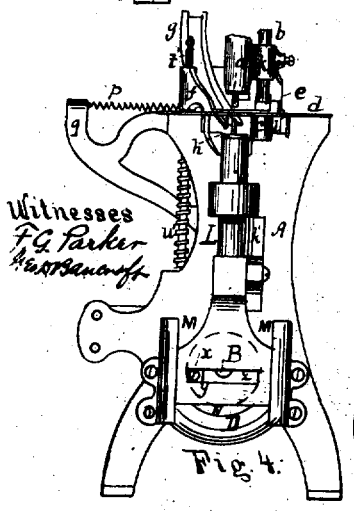
Fig. 4.
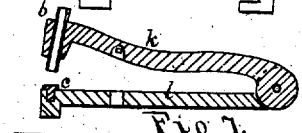
Fig. 7.
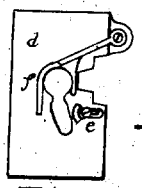
Fig. 8
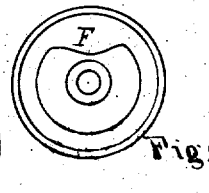
Fig. 9.
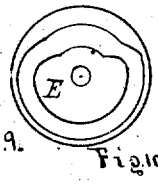
Fig. 10
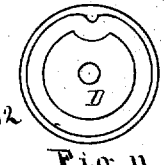
Fig. 12
Fig. 11.
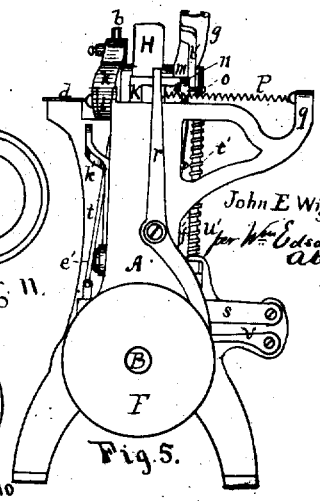
Fig. 5.
Witnesses
F. G. Parker
H. A. Banaroft
John E. Wiggin
per Wm. Edson
Atty

BEST AVAILABLE COPY

UNITED STATES PATENT OFFICE.

JOHN E. WIGGIN, OF STONEHAM, MASSACHUSETTS, ASSIGNOR TO HUGH H. MAWHINNEY, OF SAME PLACE.

IMPROVEMENT IN EYELETING-MACHINES.

Specification forming part of Letters Patent No. 126,916, dated May 21, 1872; reissue No. 4,429, dated June 15, 1875; application filed April 29, 1875.

*To all whom it may concern:*

Be it known that I, JOHN E. WIGGIN, of Stoneham, of the county of Middlesex and State of Massachusetts, have invented a new and useful or Improved Eyeleting-Machine; and do hereby declare the same to be fully described in the following specification, and represented in the accompanying drawing, of which—

Figure 1 denotes a top view, Figs. 2 and 3 opposite side elevations, Figs. 4 and 5 opposite end views, Fig. 6 a longitudinal and vertical section, of it.

Such other figures as may be necessary to a proper illustration of the invention are hereafter referred to and described.

The machine punches the eyelet-holes, feeds along the material to be eyeleted, and inserts in each hole and upsets an eyelet, the feeding of the material being effected by the anvil and its operative mechanism, in manner as hereinafter described. The machine is so constructed that after each hole has been punched the anvil and punch are simultaneously moved backward laterally until the anvil is brought directly over the hole, after which the anvil is depressed into the hole, and next is moved forward laterally, so as to move forward the material the distance that may be required for such hole to receive an eyelet, which is next inserted in the hole and upset by the upsetter.

In the drawing the feeding-anvil is shown at *a*, the punch at *b*, the punch-bed at *c*, the work-supporting platform at *d*, the adjustable gage at *e*, the presser at *f*, the feeding-spout at *g*, the eyelet-compresser, at *h*, and the eyelet-receiver at *i*, all being arranged as shown.

Fig. 7 is a vertical section of the punch *b*, the bed *c*, and their carriers, which consist of two arms, *k l*, formed and arranged as shown and hinged together at their rear ends. Fig. 8 is a top view of the work-supporting platform *d*, and the adjustable gage *e* and the presser *f*.

The main frame for sustaining the principal operative parts is shown at A, it having arranged in it and duly sustained in proper bearings a driving-shaft, B, provided with three grooved cams, D E F, and an additional cam, G, side views of which are given in Figs. 9, 10, 11, and 12. The feeeding-anvil or upsetter projects from the arm of a lever, H, pivoted to the head *m* of a vertical shaft, I, arranged in the main frame, as shown, so as to be capable of turning horizontally, the lever also turning vertically, as occasion may require. The bed-carrier *l* is fastened to the head *m*, and is movable therewith, the fastenings being such as to admit of the bed and punch being adjusted to their proper distances from the anvil. The tail of the lever H is extended through the slot *n* of a guide, K, arranged and provided with an adjustable stop or screw, *o*, as shown. A spring, *p*, for moving the lever back is applied to the lever and an arm, *g*, of the frame. A lever, *r*, provided with a friction-wheel or stud to enter the groove of the cam F is pivoted to the frame, and has its upper arm resting against the tail of the lever H. The purpose of the cam F and lever R is to move the lever H in a direction to cause the anvil or upsetter to feed along the cloth or material to be eyeleted. The mechanism for depressing the punch-carrier consists of a cam, D, a lever, *s*, and connection-rods *t u*, arranged as represented, there being to the lever a friction-roller or stud to enter the groove of the cam. The presser *f* is fixed upon a vertical slide-rod, *t'*, provided with a depressing-spring, *w'*. The said rod rests on a lever, *v*, which bears upon the cam G, all being arranged as shown. The eyelet-compresser *h* is supported by a carrier, L, arranged to slide vertically between parallel guides M M, disposed as represented, the vertical motions of the carrier being effected by a cranked wheel, N, a stud, *x*, and a slide, *y*, the slide turning on the stud and being disposed in a slot, *z*, made horizontally in the upsetter-carrier. The cranked wheel is fixed upon the outer end of the driving-shaft. In the eyelet-compresser and its carrier is the eyelet-receiver *i*, formed as shown, and supported upon a spring, *a'*, arranged in said carrier. The feeding-spout *g*, disposed as represented, is supported by a standard, *b'*, erected upon a slide, *c'*, such slide being arranged and supported by parallel and horizontal guides $d'$ $d'$, projecting from the frame, all as represented. A rocker-shaft, $e$, disposed under the slide transversely of the machine and in a suitable bearing or bearings, carries an arm, $f'$, to extend from it between two projections, $g'$ $h'$, of the slide. Another arm, $i'$, from the rocker-shaft is pivoted or jointed to the anvil-carrier, which, during its vertical motions, imparts, by means of the arm $i'$, a reciprocating rotary motion to the rocker-shaft, in consequence of which the feeding-spout will be moved toward and away from the anvil, as occasion may require. The rocker-shaft is provided with an extra arm, $k'$, whose office is to actuate a suitable mechanism for agitating a box or reservoir to cause eyelets to be delivered therefrom into the feeding-spout as in other eyelet-machines. A piece of leather or work to be eyeleted is to be placed on the platform and between such and the presser and against the edge-gage. This having been done and the machine set in operation, the punch will be driven downward, so as to punch a hole in the work, after which the punch will rise out of the material, and, with the anvil or upsetter, will be simultaneously moved back laterally until the anvil may be brought directly over the hole made by the punch. Next, the anvil will be caused to descend so far as to cause its finger $l'$ to enter the side hole. Next, the presser will be raised off the material in order to allow such material to be moved on the platform by the anvil or the finger-making part of such anvil. Next, the punch $b$, the bed $c$, and the anvil $a$ are to be simultaneously moved forward laterally, whereby the finger will feed the material along until the finger may come directly over the eyelet-receiver $i$. An eyelet being previously deposited on the receiver, so as to encompass such and rest on the compresser, the latter will next be driven upward, and the presser will be drawn downward, the whole being so as to cause the material to be held firmly in place upon the platform, the eyelet to be forced up into the whole of the material and to be pressed against the anvil, so as to be inserted in the material and be fixed thereto by being upset in a manner well understood.

What I claim as my invention or improvement in eyeleting-machines is—

1. In an eyelet-setting machine the upsetting-anvil $a$, operating from above the work-supporting platform, in combination with its actuating mechanism, whereby it is adapted to automatically feed the stock after the eyelet-hole has been punched, and to set the eyelet, substantially as described.

2. The combination of the punch $b$, bed $c$, and anvil $a$, with their actuating mechanism, whereby they are given a simultaneous lateral reciprocating movement, and caused to automatically punch and feed forward the stock, substantially as set forth.

3. The combination, with the stock-feeding and eyelet-setting anvil $a$, of the presser $f$, all substantially as and for the purpose set forth.

JOHN E. WIGGIN.

Witnesses:
WILLIAM EDSON,
CHAS. LETTS.